United States Patent
Fazzini

(10) Patent No.: US 7,823,812 B2
(45) Date of Patent: Nov. 2, 2010

(54) RECYCLING METHOD OF USED TYRES AND INSTALLATION FOR THE ACTUATION OF THE SAME METHOD

(75) Inventor: Francesco Fazzini, Monteprandone (IT)

(73) Assignee: Tires S.p.A., Monteprandone (AP) (IT)

( * ) Notice: Subject to any disclaimer, the term of this patent is extended or adjusted under 35 U.S.C. 154(b) by 13 days.

(21) Appl. No.: 12/353,758

(22) Filed: Jan. 14, 2009

(65) Prior Publication Data

US 2010/0038460 A1    Feb. 18, 2010

(51) Int. Cl.
B02C 17/02    (2006.01)

(52) U.S. Cl. ........... 241/24.14; 241/24.17; 241/DIG. 31

(58) Field of Classification Search .............. 241/24.17, 241/24.14, DIG. 31
See application file for complete search history.

(56) References Cited

U.S. PATENT DOCUMENTS

| | | | | |
|---|---|---|---|---|
| 2,126,672 A | * | 8/1938 | Smith et al. | 241/19 |
| 2,471,043 A | * | 5/1949 | Schenck | 241/14 |
| 2,539,775 A | * | 1/1951 | Gordon | 241/188.2 |
| 2,827,505 A | * | 3/1958 | Farrell et al. | 264/492 |
| 3,923,256 A | * | 12/1975 | Dorner | 241/76 |
| 4,025,990 A | * | 5/1977 | Lovette, Jr. | 241/14 |
| 4,119,277 A | * | 10/1978 | Snyder et al. | 241/167 |
| 4,240,587 A | * | 12/1980 | Letsch | 241/23 |
| 4,363,450 A | * | 12/1982 | Schmidt | 241/24.12 |
| 5,395,061 A | * | 3/1995 | Merklinger | 241/101.71 |
| 5,411,216 A | * | 5/1995 | O'Keefe | 241/24.27 |
| 5,527,409 A | * | 6/1996 | Lanphier | 156/71 |
| 5,634,599 A | * | 6/1997 | Khais et al. | 241/23 |
| 5,735,471 A | * | 4/1998 | Muro | 241/23 |
| 5,755,388 A | * | 5/1998 | Yen et al. | 241/41 |
| 5,865,009 A | * | 2/1999 | Jackson et al. | 52/745.2 |
| 5,894,997 A | * | 4/1999 | Chen | 241/34 |
| 6,047,911 A | * | 4/2000 | Yap | 241/23 |
| 7,093,781 B2 | * | 8/2006 | Meckert et al. | 241/23 |
| 7,445,170 B2 | * | 11/2008 | Cialone et al. | 241/24.17 |

* cited by examiner

Primary Examiner—Bena Miller
(74) Attorney, Agent, or Firm—Hodes, Pessin & Katz, P.A.

(57) ABSTRACT

A recycling method of used tyres is disclosed, which comprises grinding of tyres to obtain tyre pieces with approximate maximum dimensions of 100×80 mm, granulating of ground tyre pieces to obtain filaments of harmonic steel and granules containing textile fibres with 1-16 mm granulometry, removal of steel filaments using the attraction of a magnetic field, and refining of granules containing textile fibre, in such a way to separate textile fibre from rubber granules with 1-3 mm granulometry for introduction on the market to mould rubber-based materials.

11 Claims, 1 Drawing Sheet

RECYCLING METHOD OF USED TYRES AND INSTALLATION FOR THE ACTUATION OF THE SAME METHOD

BACKGROUND OF THE INVENTION

Field of the Invention

The present patent application for industrial invention relates to a method and installation for recycling of used tyres in order to convert them into finished products to be introduced in the market. The expression "recycling of used tyres" refers to the destruction of the entire tyre to separate its three components: synthetic or natural elastomer; harmonic steel, and textile fibre. The elastomer can be used to obtain finished products for the most diverse sectors of public and private use.

As it is known, used tyres generate a series of problems that are mainly related to disposal. In fact, disposal by combustion or use of chemical products would cause serious environmental problems due to the introduction of toxic gases in the atmosphere.

Because of their inalterability over time, without volume modification, the build-up of tyres occupies larger and larger areas for a virtually unlimited time (deterioration time of tyres is about 1,100 years). The exhaustion of the accommodation capacity of current dumps is a very serious problem and public opinion reacts negatively every time governments try to create new rubbish dumps.

It must be considered that the tyres stored in a dump generate a proliferation of rodents, insects and reptiles, which find an excellent replacement to their natural habitat in the piles of tires. Moreover, the build-up of large rubber quantities involves in any case a great risk of fire with consequent environmental damage.

The current choice of tyre manufacturers to privilege the use of top-quality natural or synthetic rubber offer large quantities of material suitable to be converted in other rubber-based products. In fact, the recycled rubber is successfully used in the production of a very large range of rubber finished products, part for the automotive industry and processing of new tires. Therefore, the dumps of used tyres are a waste of valuable raw materials that could be recycled and reused.

BRIEF SUMMARY OF THE INVENTION

One of the main purposes of the present invention is to eliminate the inconvenience of the known technique by means of a method and installation designed to recycle used tyres that are converted in new secondary raw material for numerous applications.

Another purpose of the present invention is to provide equipment not only to solve the problem of recycling used tires, but also build advanced industrial installations that produce rubber dust, granulates and value-added products of high quality.

These purposes are achieved by the present invention, with the characteristics listed in the enclosed independent claims 1 and 6.

Advantageous embodiments are disclosed in the dependent claims.

The purpose of the present patent is to obtain a continuous process in which entire tyres of different sizes are introduced and disgregated to obtain products made of recycled rubber and textile fibre to be used in public and private building by means of press moulding.

The solution according to the present invention is an environmental-friendly recycling system that does not alter the fragile environmental balance, since it does not introduce combustion gases in the atmosphere and it does not use water or chemical elements.

Moreover, it eliminates the hygienic problems of proliferation of rodents, insects and reptiles, which find an excellent replacement to their natural habitat in the piles of tires. Moreover, by avoiding the build-up of large rubber quantities the risk of fire and consequent environmental damage are eliminated.

BRIEF DESCRIPTION OF THE DRAWING

The drawing is a flow chart of the invention's processes.

DESCRIPTION OF THE INVENTION

Figure 1:
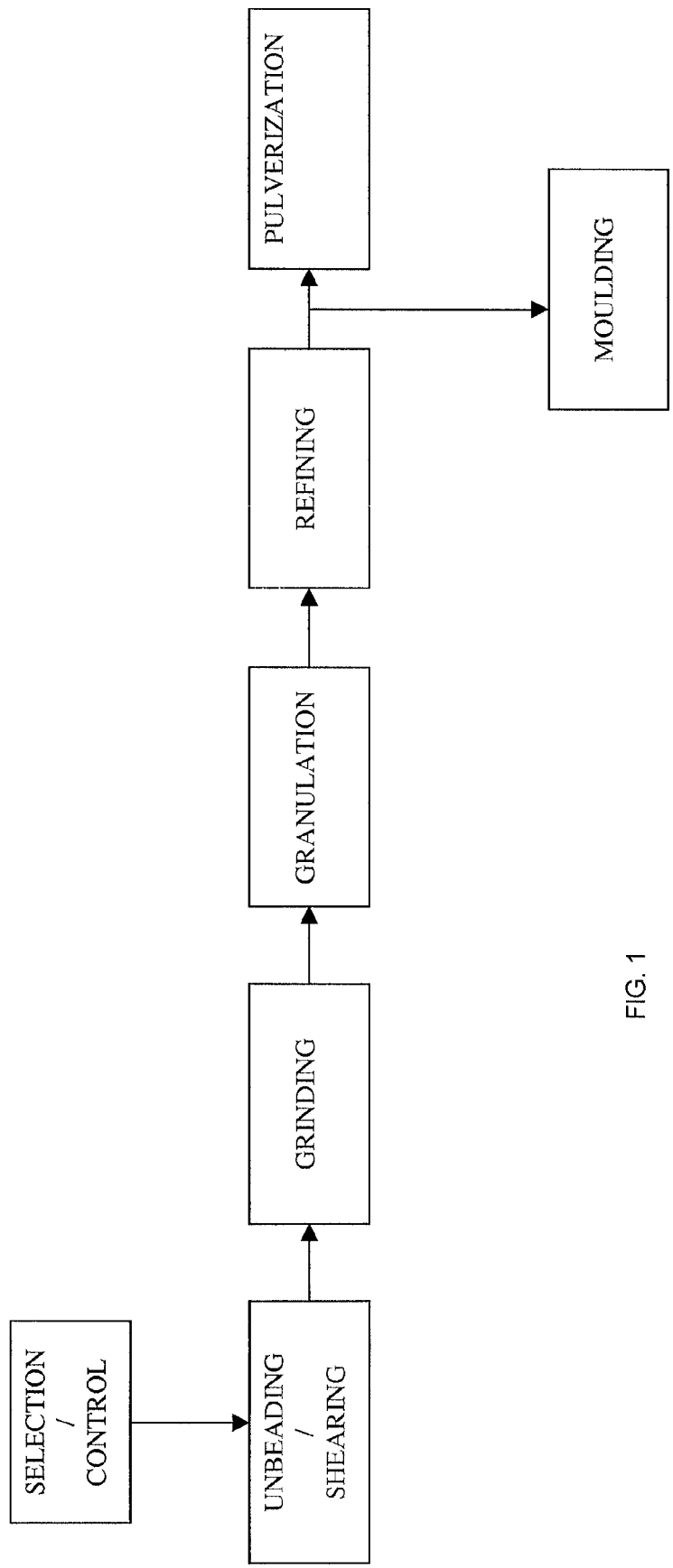

Additional characteristics of the invention will become more evident from the following description, which refers to a merely illustrative, not limiting embodiment illustrated in the enclosed drawings, in which the only FIGURE is a block diagram that shows the different phases of the recycling process of used tyres according to the present invention.

The first processing phase of the tyre is unbeading, as described below. However, before starting the said phase, the operator must select and check the tyres to be subjected to unbeading. During the introduction of tyres the operator must necessarily check the internal of the shell to detect the presence of any foreign body before the tyre is processed by the machines of the installation according to the present invention.

The following table summarizes the collection criteria:

| | |
|---|---|
| SUMMER CAR TIRES | All tyres that are actually on the market can be processed without unbeading |
| WINTER CAR TIRES | They can be introduced in the installation without unbeading in 1/20 ratio with respect to ordinary summer car tires. |
| VAN OR JEEP TIRES | Unbeading is NECESSARY before introducing the tyres into the loading belt of the installation. |
| LORRY TIRES | Unbeading is NECESSARY before introducing the tyres into the loading belt of the installation. |
| TRACTOR TIRES | Unbeading is NECESSARY before introducing the tyres in the loading belt, as well as cutting if overall dimensions are higher than 1200 mm of diameter. |

Winter car tyres can be recognized from the reconstruction phase they have been subjected to. Past experience has shown that soft synthetic rubber tyres tend to become "pasty" during grinding according to temperature, and therefore the uncontrolled introduction of this type of tyre may cause a reduction of the production rate. Conveniently, a winter tyre is introduced every 20 summer tires.

Lorry tyres that are currently used on the market do not contain textile fibre and therefore can be used proportionally to reduce the volume of textile fibre braid that is present on the finished product. In order to constantly obtain a better quality for specific applications, tyres must be mixed as follows: one lorry tyre every 10 car tires. This type of mixture ensures both a constant production of the installation and homogeneous quality.

With respect to car tires, tractor tyres contain 10 times more textile fibres than rubber KG; this means that the continuous introduction of this type of tyre will greatly affect the quality of the finished product. Therefore, one tractor tyre must be introduced in the loading station every 30 tyres of other types.

Once the sequence of tyre types to be introduced in the installation has been selected, unbeading is performed, which consists in the removal of the harmonic steel border situated on the internal diameter of the tire.

For lorry tires, for example, the border is composed of a braid of harmonic cables with 2-2.5 mm diameter. As a whole they form a ring of approximately 20 mm diameter. The extraction of this ring from the tyre greatly reduces the possibility of anomalous breakages of the cutting tools, without impairing the operation of the installation.

By using a simple control panel situated near the feeding station, the unbeading machine allows the operator to handle the tyres in order to perform unbeading with three simple operations: centering the tire, cutting the tire, cutting the tire, positioning the hooks and unbeading.

The production rate of the machine is max. 23 lorry tyres per hour, with the same perfect efficiency conditions. However, only 18 lorry tyres per hour are necessary to guarantee the maximum quantities to be processed. Tyres without bead and tyres that not require unbeading are sent to the grinding phase, which is the first significant process for the tire.

The installation of the invention is equipped with grinders in cascade with a closed circuit system, from which pieces with max. dimensions of 100×800 cm are obtained.

Grinders are composed of a cutting unit and a hydraulic control unit. The cutting chamber has 80×130 cm dimensions. The cutting tools have been designed to grab the lorry tyre with a hook and grind it with two rotors.

The possible overloading of the machine is managed by a control unit that is controlled by the corresponding switchboard and actuates the two blade-holder rotors to invert the rotation direction automatically in order to release the cutting chamber from an excessive material overlapping.

The grinders have a production rate of approximately 6000 Kg/h each; in spite of the fact that the installation uses 30% of this quantity, this fact ensures that the structure will remain unaltered over time, with double maintenance intervals for the blades.

The pieces of ground tyres are sent to a granulation phase, which consists in transforming ground pieces into granules from 1 to 16 mm of apparent diameter. This phase is the main operation of the installation, in which 99% of the remaining metal is separated from the tire.

The granulation machine is composed of a strong rotor with 530 mm diameter that is provided with blade holders and a machine body in which fixed blade holders are installed on the right and left-hand walls. A grid is provided in the lower part of the machine to allow the product to be ejected only if the predetermined size is achieved.

The granulation machine is completely automated by the switchboard, using a PLC that detects the instantaneous absorption and manages all automatisms. The synoptic display of the granulator shows the default reference data set by the manufacturer, which can be modified by the operator with a password.

The granulator, which is fed with ground pieces of 100×80 mm dimensions, has a capacity at the maximum loading point of about 200 Kg/h, maintaining the machine in perfect operating conditions.

Filaments of harmonic steel and 1-16 mm granules with textile fibre are obtained from the granulator. Moreover, the granulation phase is provided with a dust reduction filter that eliminates the textile fibres extracted during grinding.

The granules and harmonic steel wires that come out of the grid are transported, by means of vibrator and conveyor belt, under the passage of a magnet situated at a suitable height, set by the manufacturer, which attracts the steel wires. The metal that has been already separated from the rubber is also extracted with a magnetic drum situated at the top of the vibration table used to collect the finest wires.

The tyre granules deprived of iron are sent to a silo by means of soundproof pneumatic transportation used to cool the product down for safe storage. Preferably, the material stored in the silo is completely processed at the end of the day, in order to avoid the creation of vacuum in the extractor due to the presence of humidity.

The granules stored in the silo are sent to a refining phase, which consists of the additional reduction of the granule cross-section in order to separate the remaining metal and textile fibre. The refining phase is performed by using a quick mill that is basically designed as the granulator. However, the quick mill has a rotor speed that is almost triple than the granulator.

The granulometry of the rubber obtained from the refining phase is 1-3 mm of apparent diameter. The textile material that is obtained consists in small flocks of wool.

After grinding, the materials are pneumatically transported to a textile separation system; this process is of fundamental importance because it determines the quality of the finished product.

The mixed rubber/fibre material is classified in air depression by means of suitable machinery, until the clean granules are transported to a silo that contains a permanent magnetic plate used to eliminate the remaining steel before big bag packaging.

The textile material is pneumatically transported outside and stored in a container in the warehouse. The refined rubber granules are sent to a pulverisation phase that allows obtaining a product with specific physical-mechanical properties.

Rubber pulverisation is efficient and profitable, both from production and economic viewpoints, since it allows for large flexibility of use on the market and since the remuneration of the finished powder product is considerably higher than granules.

The operating principle of the pulverisation machine is based on a controlled environment mechanical process in which the rubber granules are fragmented, in a very short time, into granulometry mostly lower than 400 microns. The peculiarity of the finished product is represented by the granulometry curve and surface configuration that make it possible to use it in the most diverse application sectors. This processing criterion has been obtained by modifying the disgregation system of the machine.

The air that is necessary for the pneumatic transportation is conveyed into two filters of self-cleaning sleeves installed outside in which the residual powder of the installation is settled and stored in a big collection sack. The filtered air is ejected into the atmosphere in compliance with environmental regulations.

Both the granulation and refining phases need cooling water on the machines that are operated during the grinding phase. This water is managed by a closed circuit that comprises a 10 $m^3$ tank (used as expansion chamber) and a chiller for cooling.

The use of this technology makes it possible to use secondary raw material obtained from the grinding installation in order to convert it into finished product. The processing method is eco-compatible because cold production systems are used during processing, without altering the chemical-physical aspect of the rubber.

The 1-3 mm granule is stored in a silo near the press area and loaded by means of extractor on a load cell scale that determines the correct volumetric quantity. Then, it is mixed with a mono-component polyurethane binder inside a mixer to prepare a rubbery conglomerate to be spread on the press surface.

The dose is determined by a PLC software according to the type of artefact to be produced, taking into consideration the pressing tolerance. The product is manually introduced in the press top in which specific cavities are obtained to determine the finished product.

For illustrative purposes, the production of a parallelepiped artefact with 200×100×30 mm is described.

The resin/rubber granule conglomerate is introduced in the press surface from the mixer area by means of a bucket that is filled with an automatic weighing system. Then the material is distributed uniformly in the mould cavities.

The control panel actuates the hydraulic device used to position and press the press surface, and the second mould will come out from the opposite side in parallel from the press area. The permanence time under the oil-heated top of the press will be about eight minutes. In the meantime the operator will fill the second mould with the conglomerate. After approximately eight minutes, the mould will open automatically and the second mould ready for pressing will be introduced. In the meantime, by using the hydraulic extractor installed in the lower part of the conglomerate loading area, the operator will release the finished product and place it on a pallet. Then the operator will load the conglomerate again in the empty mould and cyclically repeat the aforementioned operations.

The presses are designed for the installation of a depression suction system for the polyurethane resin exhalations during surface heating. One operator for each press and one operator for mixer feeding/warehouse will be necessary. The installed power will be about 20 kW each for oil-actuated presses and about 20 kW for the mixer. The pallet used for supplies has 1000×1000 mm dimensions, being suitable for transportation in containers. The installation will work with three working shifts 24 hours a day.

The method and the installation for the actuation of the said method may be implemented with additional phases, according to the needs determined by the experts of the art. Obviously, the aforementioned dimensions may be modified by the experts of the art, without any inventive effort, for example to dimension the installation for other productions of artefacts.

In any case numerous variations and modifications can be made to the present embodiment of the invention by an expert in the field, while still falling within the scope of the invention as claimed in the enclosed claims.

What is claimed is:

1. Recycling method of used tyres that comprises the following steps of:
    grinding of tyres by means of a grinder to obtain pieces of tyres with approximate maximum dimensions of 100× 80 mm,
    granulating of ground tyre pieces by means of a granulation machine to obtain filaments of harmonic steel and granules containing textile fibres with 1-16 mm granulometry of apparent diameter,
    removal of steel filaments by means of attraction of a magnetic field,
    refining of granules containing textile fibre by means of a quick mill and application of air depression to separate the textile fibre from the rubber granules with 1-3 mm granulometry of diameter, wherein the tyres may be used to obtain products made of recycled rubber and textile fibre.

2. Method of claimed in claim 1, characterized in that before grinding the tyres that contain a border of steel fibres are subjected to unbeading to remove the said fibre border.

3. Method as claimed in claim 1, characterized in that before grinding, tyres with dimensions higher than 1200 mm are subjected to shearing to cut them in smaller pieces.

4. Method as claimed in claim 1, characterized in that after refining, the refined rubber granules are subjected to pulverization to fragment the granules in powder with granulometry lower than 400 micron.

5. Method as claimed in claim 1, characterized in that, after refining, the refined rubber granules are mixed with a mono-component polyurethane binder forming a rubber conglomerate and sent to moulding, in which the rubber conglomerate is moulded to produce articles.

6. Method as claimed in claim 1, characterized in that the tyres are selected and are fed into the system according to the group consisting of:
    one winter tyre every 20 ordinary summer tires,
    one lorry tyre every 10 car tires, and
    one tractor tyre every 30 tyres of other type.

7. Recycling system of used tyres comprising:
    at least one grinder including two rotors with contra-rotating blades used to grind tyres until tyre pieces with approximate maximum dimensions of 100×80 mm are obtained,
    a granulation machine including a rotor with rotating blades, fixed blades joined to the walls of the machine body and a grid in order to obtain filaments of harmonic steel and granules containing textile fibre with 1-1 mm granulometry of diameter,
    a magnet to remove the steel filaments mixed to the rubber and fibre granules,
    a quick mill with rotor that rotates at a very high speed to separate the textile fibre from the rubber granules with 1-3 mm granulometry of diameter, and
    air depression application means to apply vacuum to remove the textile fibre mixed to rubber granules.

8. System as claimed in claim 7, characterized in that it comprises an unbeading machine designed to remove a border of steel fibres contained in some tires.

9. System as claimed in claim 7, characterized in that it comprises a shearer designed to cut tyres with dimensions higher than 1200 mm in smaller pieces.

10. System as claimed in claim 7, characterized in that it comprises a pulverization machine designed to fragment the rubber granules in powder with granulometry lower than 400 micron.

11. System as claimed in claim 7, characterized in that it comprises:
    a mixer used to mix rubber granules with a polyurethane binder forming a rubber conglomerate; and
    a moulding press designed to mould the rubber conglomerate to produce artifacts.

* * * * *